United States Patent
Segeler

(10) Patent No.: US 6,991,582 B2
(45) Date of Patent: Jan. 31, 2006

(54) LOCKING DEVICE FOR A SELECTOR LEVER OF A MOTOR VEHICLE TRANSMISSION

(75) Inventor: Armin Segeler, Grünendeich (DE)

(73) Assignee: DaimlerChrysler AG, Stuttgart (DE)

( * ) Notice: Subject to any disclaimer, the term of this patent is extended or adjusted under 35 U.S.C. 154(b) by 41 days.

(21) Appl. No.: 10/723,587

(22) Filed: Nov. 26, 2003

(65) Prior Publication Data

US 2004/0134298 A1 Jul. 15, 2004

(30) Foreign Application Priority Data

Nov. 27, 2002 (DE) ................. 102 55 214

(51) Int. Cl.
*F16H 59/74* (2006.01)

(52) U.S. Cl. .............. 477/99; 74/473.31; 74/473.35; 74/473.3; 74/473.32; 74/483 R; 74/484 R

(58) Field of Classification Search ............. 477/99; 74/473.31, 473.35, 473.3, 473.32, 483 R, 74/484 R; 70/247, 252, 245
See application file for complete search history.

(56) References Cited

U.S. PATENT DOCUMENTS

| | | | | |
|---|---|---|---|---|
| 4,474,085 A | * | 10/1984 | DeVogelaere et al. | 477/99 |
| 4,821,605 A | * | 4/1989 | Dzioba | 477/99 |
| 4,967,883 A | * | 11/1990 | Kito et al. | 70/245 |
| 5,299,470 A | * | 4/1994 | Snell et al. | 477/99 |
| 5,428,977 A | * | 7/1995 | Knape | 70/247 |
| 5,490,585 A | * | 2/1996 | Togano | 477/96 |
| 6,055,881 A | * | 5/2000 | Oda | 74/473.31 |
| 6,059,687 A | * | 5/2000 | Durieux et al. | 477/94 |
| 6,170,353 B1 | * | 1/2001 | Worner et al. | 74/473.21 |
| 6,382,045 B1 | * | 5/2002 | Wheeler | 74/473.12 |
| 6,547,696 B2 | * | 4/2003 | Syamoto et al. | 477/99 |
| 6,684,730 B2 | * | 2/2004 | Giefer et al. | 74/473.23 |
| 6,852,065 B2 | * | 2/2005 | Yamada et al. | 477/99 |
| 6,854,354 B2 | * | 2/2005 | Meyer | 74/473.23 |

FOREIGN PATENT DOCUMENTS

| | | |
|---|---|---|
| DE | 41 20 379 | 1/1993 |
| DE | 198 18 863 | 11/1999 |
| DE | 198 44 279 | 3/2000 |
| DE | 101 01 983 | 7/2003 |
| JP | 04181056 A * | 6/1992 |
| JP | 04274931 A * | 9/1992 |

* cited by examiner

*Primary Examiner*—Charles A. Marmor
*Assistant Examiner*—David D. Le
(74) *Attorney, Agent, or Firm*—Klaus J. Bach

(57) ABSTRACT

In a locking device for a selector lever of a motor vehicle transmission comprising a locking member, which is pivotally supported on a support structure, and an adjustable locking element is supported on the support structure and engages the locking member for fixing the selector lever, a locking part is mounted resiliently on the locking member so as to bear against the support structure and to engage the selector lever, the locking part being movable by the selector lever between a first rest position to second position by application of a predetermined force by the selector lever.

9 Claims, 3 Drawing Sheets

LOCKING DEVICE FOR A SELECTOR LEVER OF A MOTOR VEHICLE TRANSMISSION

BACKGROUND OF THE INVENTION

The invention is concerned with a locking device for a selector lever of a motor vehicle transmission, having a locking member, which is pivotally supported on a support structure and which can be fixed via an adjustable locking element in a position in which the selector lever is locked.

A selector device for an automatic motor vehicle transmission is already known from DE 198 18 863 C1. In this case, a selector element for selecting gear positions can be set manually. A toggle lever arrangement which is connected to the selector element acts transversely with respect to the direction of movement of a locking element, so that a manual force on the selector lever element is not transmitted to the locking element or is only transmitted to a greatly reduced extent.

It is the object of the present invention to provide a selector lever lock in such a manner that a well-defined maximum force, which can be noticed by the user, acts on the selector lever lock.

SUMMARY OF THE INVENTION

In a locking device for a selector lever of a motor vehicle transmission comprising a locking member, which is pivotally supported on a support structure, and an adjustable locking element supported on the support structure and engaging the locking member for fixing the selector lever, a locking part is mounted resiliently on the locking member so as to bear against the support structure and to engage the selector lever, the locking part being movable by the selector lever between a first rest position and second position by application of a predetermined force by the selector lever.

As a result, the retaining force of the locking element for the locking member is predetermined and a known maximum force, which corresponds to the elastic deformation of the locking part, is not exceeded. The locking element or a holding magnet for the locking element can therefore be correspondingly dimensioned. In addition, the operator notices that the selector lever is in a locked state because the selector lever can be pivoted for a noticeable distance and then perceptibly comes to bear against the support structure. Also, a small, but perceptible restoring force of the moved locking part is noticeable.

For this purpose, it is advantageous that the selector lever can engage in the pivoting direction the locking part and the locking part bears against the support structure by the pivoting movement of the selector lever. By engaging the support structure in the pivoting direction the stop of the selector lever or, respectively, the locking part is reached directly and very rapidly.

Additionally, according to one embodiment, the locking part may be arranged between the selector lever and the support structure and the locking part may have a first bearing surface for the selector lever and a second bearing surface for the support structure. With the bearing surfaces and their design, the stopping behavior of the selector lever can be determined. In addition, the wear behavior of the stops can be determined by an appropriate design or coating.

Furthermore, it is advantageous if the locking part is connected elastically to the locking member. In an integral design of the locking member and of the locking part, the property of the material may be different in the region of the locking part, so that the latter can be elastically deformed.

It is also advantageous in this respect if the locking part is a sliding element within the locking member and a spring element is arranged between the locking member and the sliding element. In this connection, the locking member is rigid, the elasticity of the locking part being ensured by the spring element and the displaceability of the locking part. The sliding element can also be part of the locking member that is, it can be formed integrally therewith, for example.

Preferably, in the fixed position of the locking member, the sliding element abuts with its second bearing surface a stop of the support structure. The stop surfaces can be lined or designed in an appropriate manner with respect as to their stopping behavior or their wear behavior.

Of particular importance for the present invention is the fact that the locking force acting on the locking member by the selector lever is not greater than the pre-stressing force of the elastic locking part or of the spring element. The locking element or the clamping magnet for the locking member can therefore be dimensioned efficiently.

In the design and arrangement according to the invention, the locking member is preferably operatively connected to an ignition lock so that an ignition key is held in the ignition lock when the locking member is pivoted.

It is furthermore advantageous if the first stop surface, the second stop surface of the locking part and/or the stop surface of the support structure are provided with a friction-reducing and/or impact-dampening lining. As already described above, the stopping behavior and the wear of the various bearing surfaces can be optimally selected in this way.

In addition, it is advantageous if, at the beginning of a selection process, the selector lever is brought to bear against the locking member and/or against the locking part, and the locking member is pivoted in its unlocked position as a result of the selection movement of the selector lever. In this case, the locking member, which is in a position in which it is fixed by the locking element, bears because of the pivoting movement of the selector lever directly or indirectly against the selector lever via the locking part. Further pivoting movement of the selector lever than brings the locking part, which is of elastic design, to engage the support structure while the locking member is retained in its fixed position.

The invention will become more readily apparent from the following description on the basis of the accompanying drawings.

DESCRIPTION OF A PREFERRED EMBODIMENT

Figure 1:
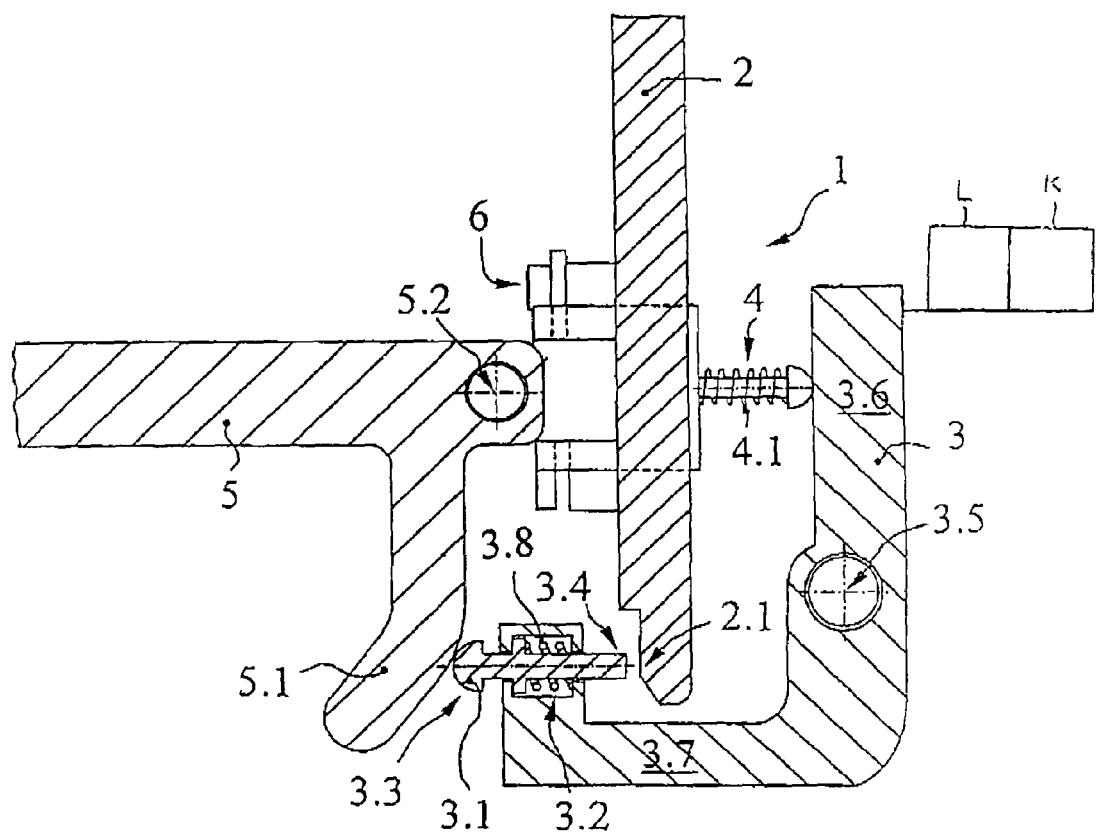
FIG. 1 shows a locking device with a locking member and selector lever in the rest position.

A transmission selector lever 5, which is illustrated in FIG. 1, is provided with a locking device 1. The selector lever 5 is supported pivotally about an axis of rotation 5.2 by a support structure 2 or directly by another engagement structure. The selector lever 5 has a selector-lever lug 5.1, which comes to bear against the locking device 1 or against a locking part 3.1, when the selector lever 5 is pivoted. The selector-lever lug 5.1 extends in this case at a right angle to a longitudinal axis of the selector lever 5.

The locking device 1 includes a locking member 3 which is supported pivotally about an axis of rotation 3.5 on a body structure 2 or directly on the vehicle body. In this case, the locking member 3 is L-shaped. A first leg 3.6 of the locking member 3 is in contact with a locking element 4 and a second leg 3.7, which is arranged approximately perpendicularly to the first leg 3.6 carries a locking part 3.1 for engaging the selector lever 5. The axis of rotation or pivot axis 3.5 is arranged between the two legs 3.6 and 3.7.

The locking element 4 is provided with a locking magnet 6, which, in its activated state, retains the locking element 4 in its locking position as shown in FIG. 1. In the deactivated state of the locking magnet 6, the locking element 4 can be shortened or retracted against a small spring force of a return spring 4.1.

Via the second leg 3.7 and the first leg 3.6, the locking member 3 co-operates with the locking element 4, which is held in its fixed position as illustrated in FIG. 1 by a clamping magnet 6. In its fixed position, the locking element 4 prevents the locking member 3 from pivoting counter-clockwise according to FIG. 1.

On the side opposite of the locking member 3 with respect to the axis of rotation 3.5, i.e. on the second leg 3.7, the locking member 3 carries a locking part 3.1, which, when the selector lever 5 is pivoted, is engaged by the latter or, respectively, the selector-lever lug 5.1. In this case, the locking part 3.1 bears with a first bearing surface 3.3 against the selector-lever lug 5.1.

Figure 2:
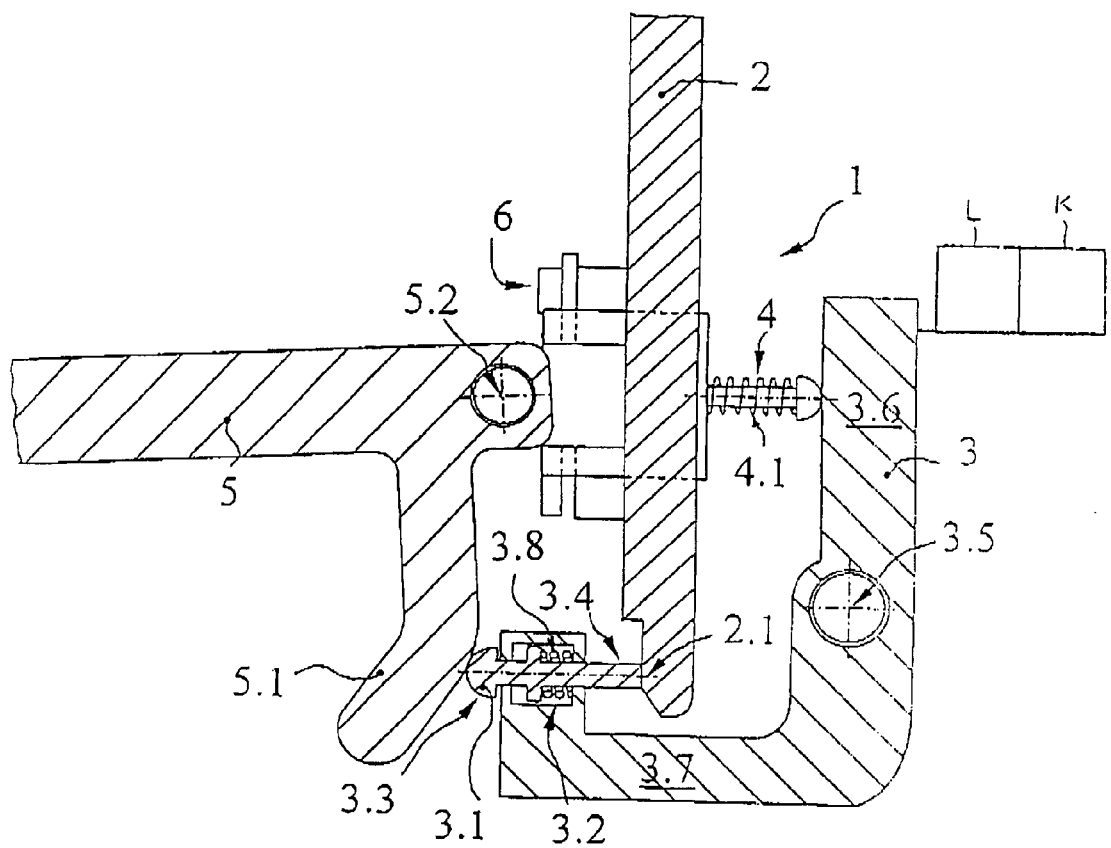
FIG. 2 shows a locking device with a selector lever and a locking member in the fixed position.

In FIG. 2, the selector lever 5 is pivoted, so that the selector-lever lug 5.1 abuts the locking part 3.1 and moves the latter counter to the return force into engagement with the support structure 2 because of its resilient support 3.2. As a result, the locking part 3.1 contacts with its second bearing surface 3.4 a stop on a surface 2.1 of the support structure 2.

The resilient support 3.2 of the locking part 3.1, which is in the form of a sliding member, is cylindrical and includes a coil spring 3.8 which biases the locking part 3.1 within the cylindrical guide toward selector lever lug 5.1. Further pivoting movement of the selector lever 5 is prevented by the form-fitting connection between the selector-lever lug 5.1 and the locking part 3.1 bearing against the support structure 2. The force of the spring, which acts on the locking member 3 by means of the locking part 3.1, is absorbed by the locking element 4 in its fixed position. The force input exceeding the spring force of the spring element 3.2 is transmitted via the first engagement surface 3.3 of the locking part 3.1 and the second bearing surface 3.4 to the engagement surface 2.1 of the body structure 2, so that the holding force to be provided by the locking element 4 corresponds to the force applied by the spring 3.8 to the second locking member leg 3.7.

Figure 3:
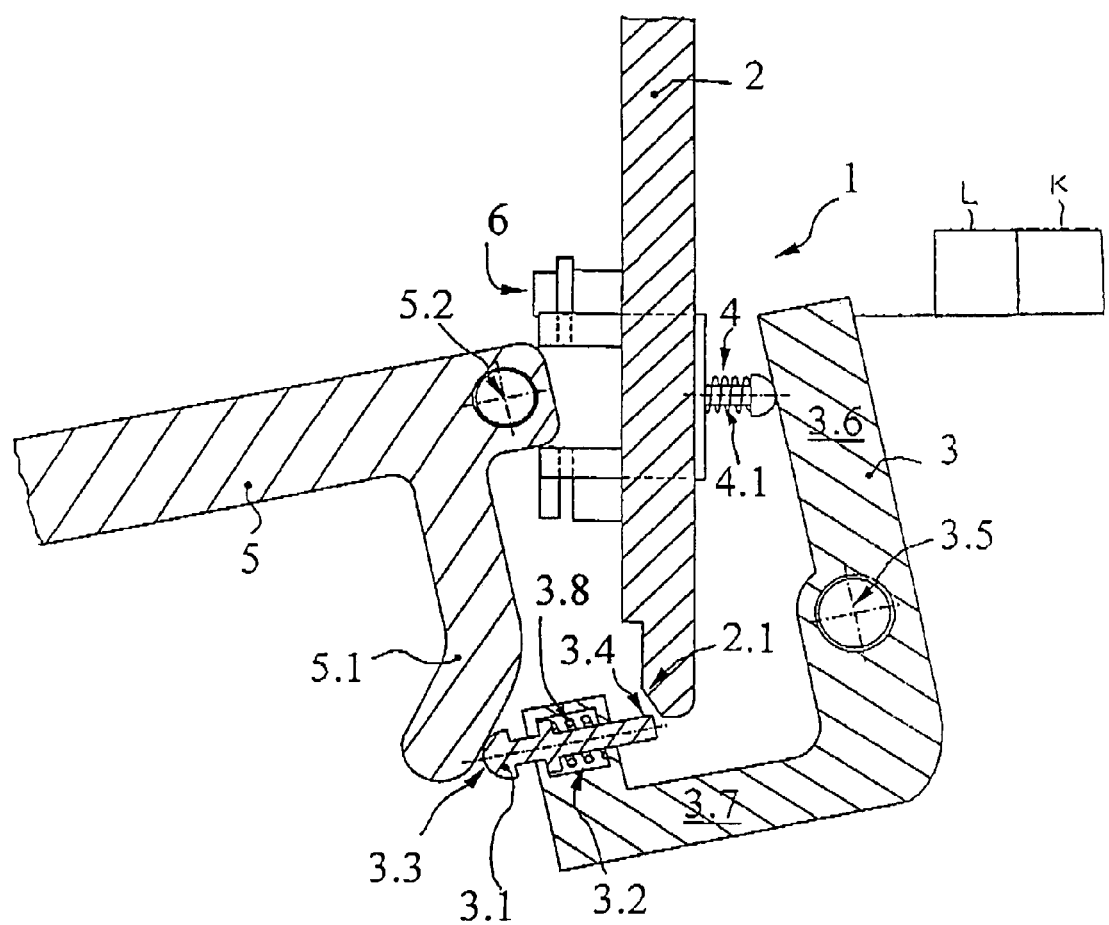
FIG. 3 shows a locking device with a selector lever and locking member in the pivoted position.

As shown in FIG. 3, the locking member 3 is in a pivoted state, wherein the locking element 4 has been compressed so that it is in a retracted position. In this position, the locking part 3.1 does not contact with its second bearing surface 3.4 the stop surface 2.1 of the body structure 2, so that the locking member 3 can only be moved or displaced against the spring force of the biasing spring 4.1 of the locking element 4. In this case, the selector lever 5 reaches a maximum pivot end position, in which it can be moved in a guide slot from a parking position P into another operating position N or D.

The locking member 3 is operatively connected to a means of locking the ignition lock in such a way that, when the locking member 3 is pivoted into a position as shown in FIG. 3, the ignition key K is retained in the ignition lock L.

What is claimed is:

1. A locking device (1) for a selector lever (5) of a motor vehicle transmission, comprising a locking member (3) pivotally supported on a support structure (2), an adjustable locking element (4) supported by said support structure (2) for fixing said locking member (3) in a position locking said selector lever (5), a locking part (3.1) mounted resiliently on said locking member (3) so as to bear against said support structure (2) and engaging said selector lever (5), said locking part (3.1) being movable between at least two positions when the locking member (3) is in a locking position, said locking part (3.1) being biased by a spring (3.8) to an end position adjacent said selector lever (5) so that said selector lever (5) is pivotable against the spring force of said locking part (3.1) permitting pivoting movement of the selector lever (5) against said spring force until said locking part (3.1) engages said support structure (2).

2. A device according claim 1, wherein said locking part (3.1) is a sliding member supported on said locking member (3) and a spring element (3.2) is arranged between the locking member (3) and the locking part (3.1).

3. A device according to claim 1, wherein said locking member (3) is operatively connected to a means of locking an ignition lock (L) such that an ignition key (K) is held in the ignition lock (L) when the locking member (3) is pivoted.

4. A device according to claim 1, wherein said locking part (3.1) is movably supported on said locking member (3).

5. A device according to claim 4, wherein the locking force acting on said locking member (3) by said selector lever (5) corresponds maximally to the force applied thereto by said spring element (3.2).

6. A device according to claim 1, wherein said locking part (3.1) is arranged between the selector lever (5) and said support structure (2) and the locking part (3.1) has a first bearing surface (3.3) for engaging said selector lever (5) and a second bearing surface (3.4) for engaging said support structure (2).

7. A device according to claim 6, wherein, in a fixed position of said locking member (3), said locking part (3.1) is movable with said second bearing surface (3.4) thereof against a bearing surface (2.1) of the support structure (2).

8. A device according to claim 7, wherein the bearing surfaces are lined in friction-reducing and impact-influencing manner.

9. A method for locking a selector lever (5) of a transmission comprising a locking device (1) for said selector lever (5), including a locking member (3) pivotally supported on a support structure (2), an adjustable locking element (4) supported by said support structure (2) for fixing said locking member (3) in a position locking said selector lever (5), and a locking part (3.1) mounted resiliently on said locking member (3) so as to bear against said support structure (2) and engaging said selector lever (5), said locking part (3.1) being movable between at least two positions when the locking member (3) is in a locking position, said locking part (3.1) being biased by a spring (3.8) to an end position adjacent said selector lever (5) so that said selector lever (5) is pivotable against the spring force of said locking part (3.1) permitting pivoting movement of the selector lever (5) against said spring force until said locking part (3.1) engages said support structure (2), said method comprising the steps of:

a) moving the selector lever 5 at the beginning of a selection process, to bear against said locking part (3.1), b) pivoting said locking member (3) if it is in an unlocked, pivotable position by the selection movement of the selector lever (5), c) or, if said locking member (3) is to remain in a position fixed by the locking element (4), placing the locking member (3) by the pivoting movement of the selector lever (5), to bear against the selector lever (5) via the locking part (3.1), and d) by a further pivoting movement of the selector lever (5) moving the locking part (3.1), resiliently against the force of said spring (3.8) to bear against the support structure (2), while the locking member (3) is held in its fixed position.

* * * * *